United States Patent
Kwatra et al.

(10) Patent No.: US 11,101,847 B1
(45) Date of Patent: Aug. 24, 2021

(54) POWER TRANSFER AMONG DEVICES ACCORDING TO A COMMON WORKFLOW

(71) Applicant: International Business Machines Corporation, Armonk, NY (US)

(72) Inventors: Shikhar Kwatra, San Jose, CA (US); Liam S. Harpur, Dublin (IE); Sushain Pandit, Austin, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/015,112

(22) Filed: Sep. 9, 2020

(51) Int. Cl.
| | |
|---|---|
| *H02J 50/12* | (2016.01) |
| *G06F 1/26* | (2006.01) |
| *H04B 1/38* | (2015.01) |
| *H04B 5/00* | (2006.01) |
| *H04W 4/80* | (2018.01) |

(52) U.S. Cl.
CPC ......... *H04B 5/0037* (2013.01); *H04B 5/0043* (2013.01); *H04B 5/0075* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 8,175,660 B2 * | 5/2012 | Porwal | ..................... | H02J 50/40 455/573 |
| 8,401,473 B2 * | 3/2013 | Tang | ..................... | H04W 99/00 455/41.2 |
| 8,898,485 B2 * | 11/2014 | Scott | ..................... | G06F 1/266 713/300 |
| 8,972,766 B2 * | 3/2015 | Goodart | ................ | G06F 9/4406 713/340 |
| 9,306,419 B2 * | 4/2016 | Qian | ..................... | H02J 7/025 |
| 9,318,909 B2 * | 4/2016 | Millet | ..................... | G07C 5/008 |
| 9,412,515 B2 * | 8/2016 | Hyde | ..................... | B60L 53/126 |
| 9,577,463 B2 | 2/2017 | McCoy | | |
| 9,843,213 B2 * | 12/2017 | Leabman | ................ | H02J 50/40 |
| 9,860,358 B2 | 1/2018 | Park | | |
| 9,939,868 B2 * | 4/2018 | Shuster | ............ | H04W 52/0277 |
| 10,093,194 B2 * | 10/2018 | Hyde | ..................... | B60L 55/00 |
| 10,141,791 B2 | 11/2018 | Bell | | |
| 10,405,215 B2 * | 9/2019 | Tavares Coutinho | .. | H04L 67/32 |
| 10,749,339 B2 * | 8/2020 | Meier | ................... | G06Q 10/063 |

(Continued)

FOREIGN PATENT DOCUMENTS

WO 2017058389 A1 4/2017

OTHER PUBLICATIONS

Liu et al., "Safe and Secure Wireless Power Transfer Networks: Challenges and Opportunities in RF-Based Systems", arXiv:1601.05648v2 [cs.NI] Feb. 11, 2016, 11 pages.

*Primary Examiner* — Tuan A Tran
(74) *Attorney, Agent, or Firm* — Stephen R. Yoder; David B. Woycechowsky

(57) ABSTRACT

Managing power distribution according to a common activity mutually performed by a set of connected devices. The common activity is divided into a series of device-specific steps for completion by the connected devices. Charge level of the connected devices is maintained according to an electrical connectivity plan that assures adequate power is available to each device for performing the series of device-specific steps.

18 Claims, 5 Drawing Sheets

(56) References Cited

U.S. PATENT DOCUMENTS

| | | | |
|---|---|---|---|
| 10,790,703 B2 * | 9/2020 | Yoden | H02J 50/40 |
| 10,812,996 B2 * | 10/2020 | Tavares Coutinho | H04L 67/10 |
| 10,848,330 B2 * | 11/2020 | Raleigh | H04L 63/10 |
| 10,873,203 B2 * | 12/2020 | Teich | H02J 50/10 |
| 10,879,741 B2 * | 12/2020 | Soryal | H02J 50/30 |
| 10,958,211 B1 * | 3/2021 | Sarwat | H02S 40/32 |
| 2008/0102903 A1 * | 5/2008 | Schultz | H04M 1/72418 455/574 |
| 2011/0016333 A1 | 1/2011 | Scott | |
| 2014/0304529 A1 | 10/2014 | Meazell | |
| 2015/0256017 A1 | 9/2015 | Hays | |
| 2015/0288193 A1 | 10/2015 | Crosby | |
| 2015/0364946 A1 * | 12/2015 | Wang | H02J 7/0047 455/573 |
| 2017/0117732 A1 | 4/2017 | Cheatham, III | |
| 2018/0175672 A1 | 6/2018 | Yoden | |

* cited by examiner

POWER TRANSFER AMONG DEVICES ACCORDING TO A COMMON WORKFLOW

BACKGROUND

The present invention relates generally to the field of electronic devices, and more particularly to power management.

There has been considerable investment in developing mechanisms for power sharing across devices by major electronic and software companies where the sole focus has been around inductive or wired mechanisms for power sharing.

Wireless power transmission is accomplished with techniques including the near field technique. Near field power transmission is a non-radiative technique used to transfer power over short distances by magnetic fields using inductive coupling between coils of wire, or by electric fields using capacitive coupling between metal electrodes. Inductive coupling is the most widely used wireless technology. Its applications include charging handheld devices like smart phones, electric toothbrushes, RFID tags, induction cooking, and electric vehicles.

Geolocation is the determination of a real-world geographic location of an object, such as a radar source, smart phone, or internet-connected computer terminal. In its simplest form, geolocation involves the generation of a set of geographic coordinates and is closely related to the use of positioning systems.

Bluetooth is a wireless technology standard used for exchanging data between fixed and mobile devices over short distances in the industrial, scientific, and medical radio bands from 2.402 GHz to 2.480 GHz and in building personal area networks. (Note: the term(s) "BLUETOOTH" may be subject to trademark rights in various jurisdictions throughout the world and are used here only in reference to the products or services properly denominated by the marks to the extent that such trademark rights may exist.)

SUMMARY

According to an aspect of the present invention, there is a method, computer program product and/or system for device power transfer comprising: (i) identifying a set of devices performing a common activity; (ii) establish an electrical connectivity plan for power transfer among a set of participating devices included in the set of devices; (iii) dividing the common activity into a set of steps, each step performed by a single device on behalf of the set of participating devices to complete the common activity; (iv) assigning each step of the set of steps to one of the participating devices; (v) monitoring charge level of the set of participating devices during performance of the set of steps; and (vi) responsive to a charge level of a first device of the set of participating devices being below a threshold level, causing a power transfer to the first device from a second device of the set of participating devices according to the electrical connectivity plan.

DETAILED DESCRIPTION

Figure 1:
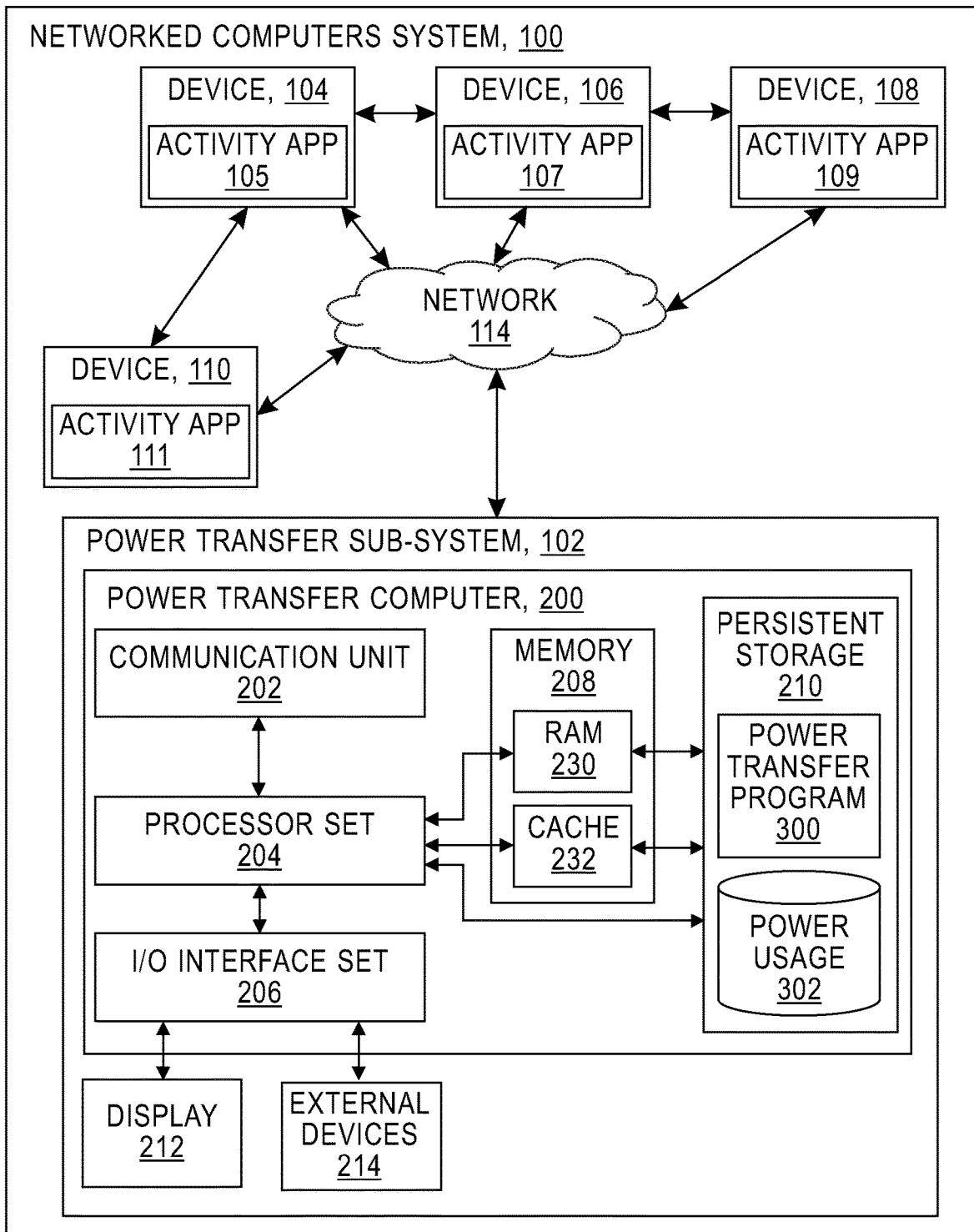
FIG. 1 is a block diagram view of a first embodiment of a system according to the present invention.

Some embodiments of the present invention manage power distribution according to a common activity mutually performed by a set of connected devices. The common activity is divided into a series of device-specific steps for completion by the connected devices. Charge level of the connected devices is maintained according to an electrical connectivity plan that assures adequate power is available to each device for performing the series of device-specific steps.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: power transfer subsystem 102 (sometimes herein referred to, more simply, as subsystem 102); device subsystems 104, 106, 108; and 110; activity applications 105, 107, 109, and 111; and communication network 114. Power transfer subsystem 102 includes: power transfer computer 200; communication unit 202; processor set 204; input/output (I/O) interface set 206; memory 208; persistent storage 210; display 212; external device(s) 214; random access memory (RAM) 230; cache 232; power transfer program 300 (sometimes herein referred to, more simply, as program 300); and power usage store 302.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage, and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with power transfer computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Power sharing technology has not yet reached the point of considering how to distribute the shared power without human intervention when a set of connected devices are jointly participating in a common activity. The common activity is sometimes referred to as a common workflow, an activity, or a workflow. The common activity consists of individual steps of operations that must be performed to conclude the activity.

Device to device power transfer either through wireless or wired electrical communications are known. If aggregated storage power is limited, then to ensure the common activity is completed, the devices should have the capability to transfer power from one device to another device. In this scenario, to perform an activity multiple steps are required in a workflow. Different devices having different capabilities may be required in the various stages of the workflow. One of the connected devices may be better at performing one step of the workflow than another device. Also, one device may perform a step more efficiently than the other. There is a need for a method and system by which, if aggregated power among the participating devices is limited, then the participating devices are grouped according to the common activity. By identifying the relative timing for use of the various connected devices to complete the common activity, a measure of which device can transfer power to another device can be determined. According to some embodiments of the present invention, connected devices are paired up in advance of performing the common activity so that a power transfer plan can assure adequate charge of the devices while performing the steps.

Figure 2:
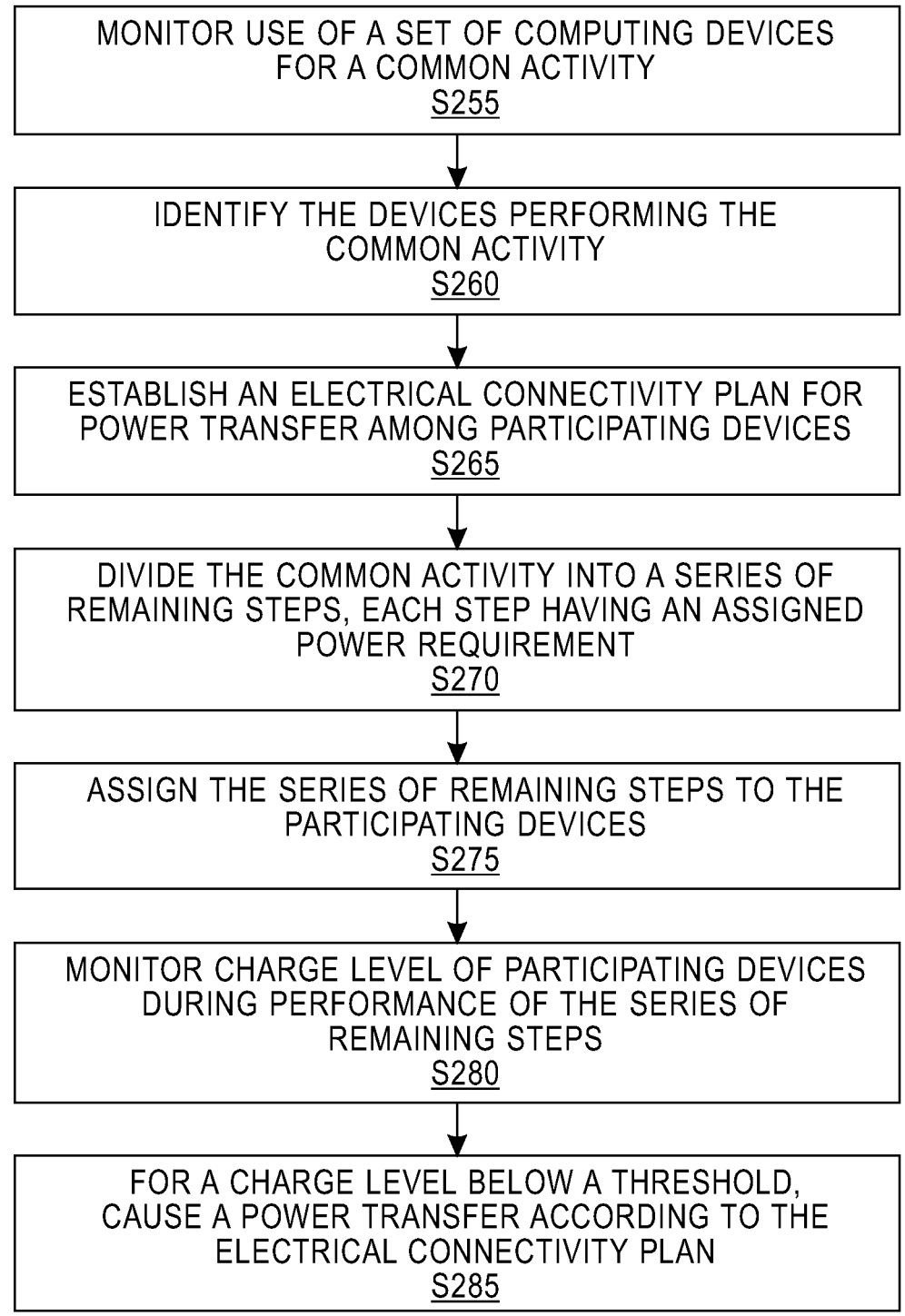
FIG. 2 is a flowchart showing a first embodiment method performed, at least in part, by the first embodiment system.
Figure 3:
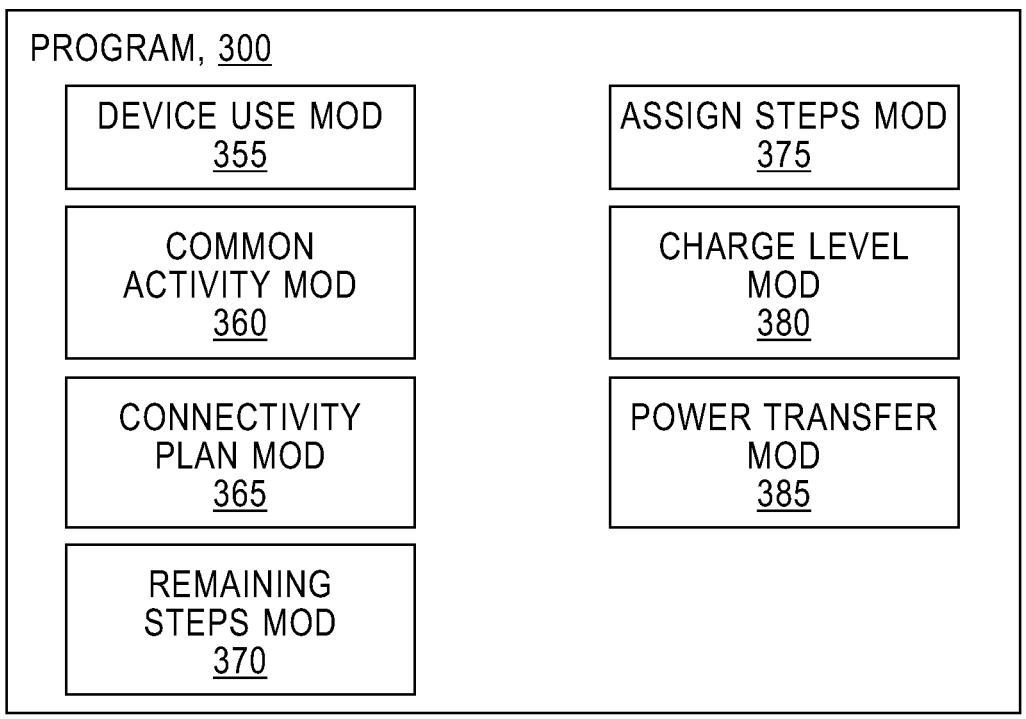
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at step S255, where device use module ("mod") 355 monitors the use of a set of computing devices for performance of a common activity. In this example, each device is monitored for application use, such as on activity apps 105, 107, 109, and 111 on devices 104, 106, 108, and 110, respectively. Specific use of applications is identified during the monitoring process. Devices in this example are registered for participation in power sharing while performing certain common activities. In some embodiments, a web application or smartphone application are activated during the monitoring process of step S255. As discussed below, alternative monitoring includes power consumption, environmental audio, and text generated and/or received by the set of computing devices. Further, according to some embodiments of the present invention, power usage store 302 includes a set of pre-determined common activities and usage triggers indicating performance of each of the pre-determined activities.

Processing proceeds to step S260, where common activity mod 360 identifies various devices of the set of computing devices that are performing a common activity. In this example, devices 104, 106, and 110 are identified as performing a common activity on applications 105, 107, and 111, respectively. Upon identification of computing devices performing a common activity, the devices are considered for participation in power sharing and shared workload process. Devices having certain characteristics at the time of performing the common activity are clustered together as participating devices. Device characteristics may include: (i) location relative to other identified devices; (ii) power transfer capability; and (ii) remaining steps to be performed to complete the common activity.

Processing proceeds to step S265, where connectivity plan mod 365 establishes an electrical connectivity plan for power transfer among participating devices. One characteristic of interest is the capability of a device to transfer and receive power from at least one other identified device. Capability refers to be technical capability and located with respect to another technically capable device such that wireless power transfer can be arranged on demand. In this example, devices 104 and 106 are electrically connected by a wired connection suitable for transferring power from one device to another. Device 110 is physically located proximate the other two devices such that device 110 can be placed in physical contact with either device 104 or device 106. Placement of device 110 may be accomplished by communication to a user causing the device to perform the common activity. For example, a pop up message may be displayed to the user prompting physical contact with one of devices 104 and 106 or a text message may be sent to any or each of the identified devices prompting a user to cause device 110 to be in physical contact with one of devices 104 or 106. In this example, physical contact is required for wireless transfer of power. Alternatively, a specified maximum distance between devices may be requested of one or more users via pop up, text message, or otherwise to ensure that wireless transfer of power is achieved.

According to some embodiments of the present invention, identified devices are grouped according to power transfer capability. That is, devices capable of transferring power by wired connection are grouped together and devices capable of a particular type of wireless power transfer are grouped together according to their particular type. Membership in one cluster or more than one cluster will qualify a device as a participating device. Alternatively, only wired power transfer is permitted. Alternatively, only a particular type of wireless power transfer is permitted.

Processing proceeds to step S270, where remaining steps mod 370 divides the common activity into a series of remaining steps, each step having an assigned power requirement. In this example, common activities are stored in power usage store 302 (FIG. 1). Each common activity is divided into process steps or operations. These process steps may include steps that are indicators of the common activity being performed. Upon determining devices performing a common activity, some devices may have completed more steps of the process than others. According to some embodiments of the present invention, the remaining steps are those steps that no device has yet completed. Alternatively, the remaining steps of those steps not yet completed by each of the devices. Further, in this example, the power usage store includes average power usage for performing each operation. Historic data is collected during performance of the common activities in support of the average power usage.

Permissible power transfer mechanisms may be based on the common activity that is being performed or the particular steps to be taken to complete the common activity. The electrical connectivity plan for power transfers includes identification of devices that can transfer power among themselves and a means to cause the devices to initiate power transfer on demand. On demand power transfer may include instructing a user to locate a first device within range of a second device to accomplish wireless power transfer. On demand power transfer may include instructing a user to establish a wired electrical connection between a first device and a second device to accomplish wired power transfer from the first device to the second device. In some embodiments of the present invention, participating devices capable of wired power transfer are electrically connected for power transfer among the participating devices prior to performing the common activity.

Processing proceeds to step S275, where assign steps mod 375 assigns the series of remaining steps to the participating devices. Because the power requirements are known for performing the remaining steps, a selection of the appropriate devices to assign the various steps is informed by the current power level of the various devices. Some embodiments of the present invention refer to a historically determined power efficiency of certain devices when assigning steps to the devices. Where remaining steps are to be performed in sequential order, the remaining steps are often assigned such that one device performs all assigned steps before the next device begins performance of assigned steps. Alternatively, remaining steps are assigned according to specific device capabilities in addition to considerations of available charge level of the devices.

Process proceeds to step S280, where charge level mod 380 monitors the charge level of participating devices during performance of the series of remaining steps. During operation of the various assigned steps, the charge level of each device is monitored so that each device has the power necessary to complete its assigned steps. It should be noted that a charge level of a non-performing device may require a charge in order to perform assigned steps not yet performed.

Processing concludes with step S285, where power transfer mod 385, for a detected charge level below a threshold, causes a power transfer according to the electrical connectivity plan. In this example, the threshold charge level is single pre-determined remaining battery life amount. The remaining battery life amount is device-specific and is determined according to historic battery use records. Alternatively, the threshold charge level varies by device according to the power required to perform the steps assigned to a device. Alternatively, the threshold charge level is pre-defined according to the activity as stored in, for example, power usage store 302. Where multiple steps are to be performed by a single participating device, the individual threshold charge levels are combined to establish an average charge level as a governing threshold value for that device.

III. Further Comments and/or Embodiments

Some embodiments of the present invention may include one, or more, of the following operations, features, characteristics and/or advantages: (i) performs device to device power transfer based on identified common goals; (ii) performs an activity by using the appropriate position of the device(s), sending and receiving, in the workflow; (iii) performs a comparison to determine the superior device to perform the assigned activity; (iv) fills the gap in power sharing and introduces a way to optimize power sharing and distribution among devices participating in a common activity; (v) recognizes significant potential in terms of cross licensing IP (intellectual property) both directly to the device manufacturers as well as other application-oriented players; and (vi) utilizes an IoT (internet of things) ecosystem (for example connected devices, smart home, etc.), comprising of more than one device to perform an activity.

Some embodiments of the present invention may include one, or more, of the following operations, features, characteristics and/or advantages: (i) three real-time data sources are analyzed: (a) electrical. (b) application level API (application programming interface), and (c) proximate words, heard or displayed; (ii) uses the data to derive a task indication model; (iii) the model output is used to derive a probable task type; and (iv) the model output is used to manage distributed charging through various remediation methods.

Some embodiments of the present invention may include one, or more, of the following operations, features, characteristics and/or advantages: (i) participating devices will be communicating with each other to recognize if the devices are performing the activity towards accomplishing a common goal; and (ii) identifies the relative position of the devices in the workflow to identify the donor and receiver of power.

As an example, and referring to the paragraph above, to complete an activity, six steps are required. The devices are D1, D2, D3, D4, D5, and D6. Devices D1, D2, and D3 complete steps 1, 2, and 3 of an activity. A new activity will then be started by device D4. Now that devices D1, D2, and D3 have completed their activities, if further power transfer is required, power can be transferred from devices D1, D2, and D3 to devices D4, D5, and D6, but not in the reverse direction.

Some embodiments of the present invention recognize that there is an investigation or discovery of related events over a period of time. These events are defined as a task by the system. Further, in some embodiments of the present invention, now that we have identified the related task and the devices involved, we can proceed to the next step where real-time device information (for example, charge) is fed into the system.

Figure 4:
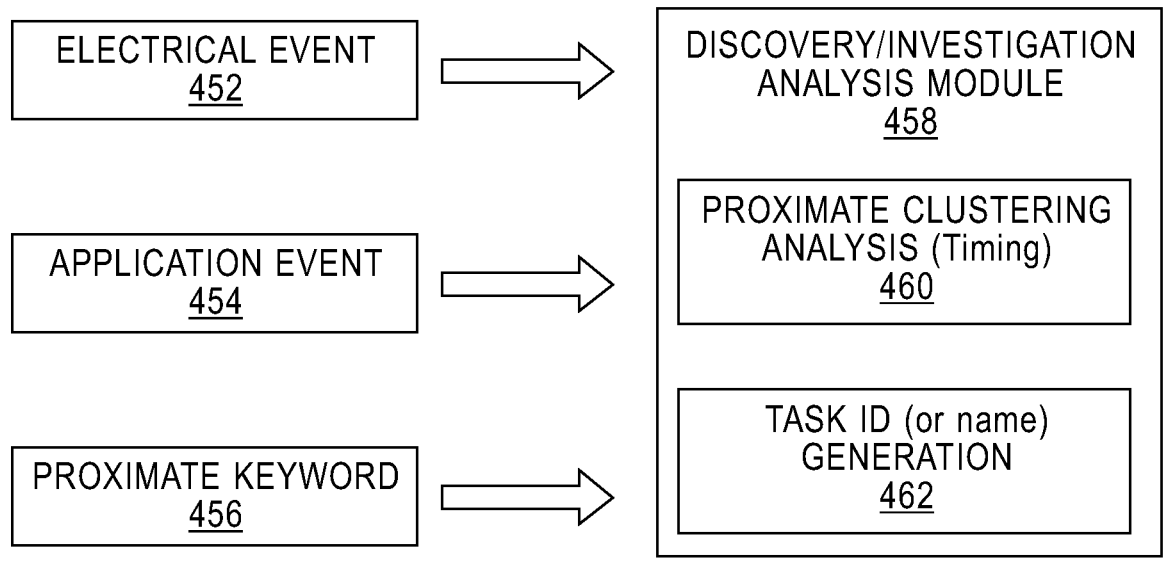
FIG. 4 is a block diagram of a first embodiment of a system according to the present invention.

As shown in FIG. 4, block diagram 450 includes: electrical event block 452; application event block 454; proximate keyword block 456; discovery/investigation analysis module block 458; proximate clustering analysis (timing) block 460; and task ID (or name) generation block 462.

Some embodiments of the present invention recognize that the above three data sources (electrical event, application event and proximate keyword) are redirected to the following analysis module as shown in FIG. 4, block diagram 450.

Figure 5:
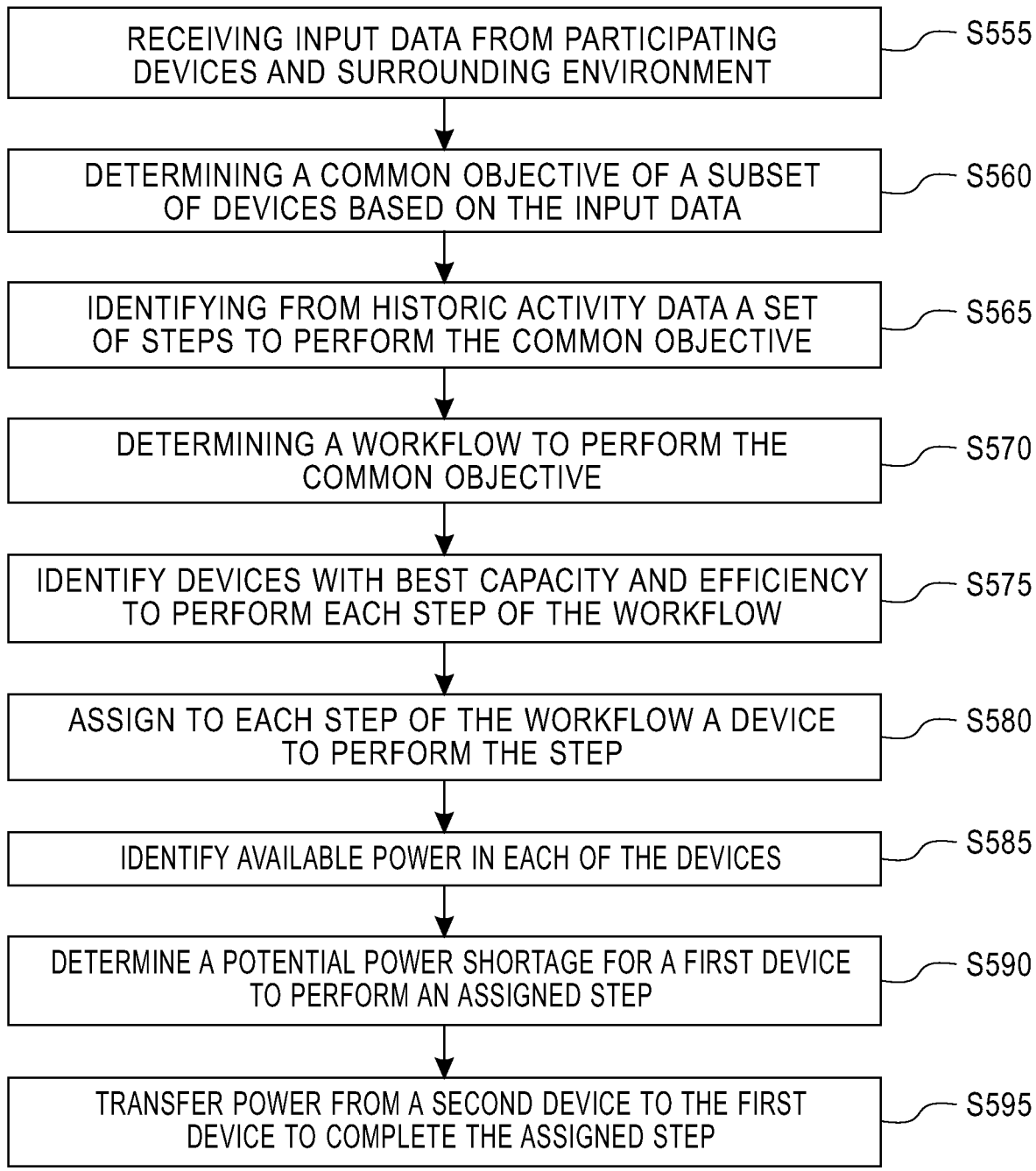
FIG. 5 is a flowchart showing a first embodiment method performed, at least in part, by the first embodiment system.

FIG. 5, as described below, is a computing system for performing operations according to some embodiments of the present invention. The illustrated computing system may be designed to operate as part of a more comprehensive computing environment such as networked computers system 100 in FIG. 1.

As shown in FIG. 5, flowchart 550 includes: receiving input data from participating devices and surrounding environment, operation S555; determining a common objective of a subset of devices based on the input data, operation S560; identifying from historic activity data a set of steps to perform the common objective; operation S565; determining a workflow to perform the common objective, operation S570; identify devices with best capacity and efficiency to perform each step of the workflow, operation S575; assign to each step of the workflow a device to perform the step, operation S580; identify available power in each of the devices, operation S585; determine a potential power shortage for a first device to perform an assigned step, operation S590; and transfer power from a second device to the first device to complete the assigned step; operation S595.

Low level data is accepted to a central server, and consists of the following three data type sources (electrical and application level API and proximate words heard or displayed):
"ElectricalEventEntry": {
 "DeviceID": "Smartphone Tab 7",
 "Event Characteristic": "SustainedAMP",
 "TimeEvent": "21 seconds",
 "SourceElectricity": "ISO 8879:1986
 "GlossSeeAlso": ["GML", "XML"]
 },
"ApplicationEventEntry": {
 "ProgramID": "Presentation Software",
 "DisplayMode": "Notes/Navigation",
 "TimeEvent": "219 seconds",
 "DeviceID": "78ty9-(yd6s)"
 },
"ProximateKeywordEventEntry": {
 "Location": "53.1424° N, 7.6921° W",
 "DataType": "Audio",
 "Keyword": "Washing machine",
 "DeviceID": "0098ty9-(98d6s)"
 }, As shown in FIG. 6, plot diagram 650 includes: clusters 652; customer (object) 654; and variables 656.

Figure 6:
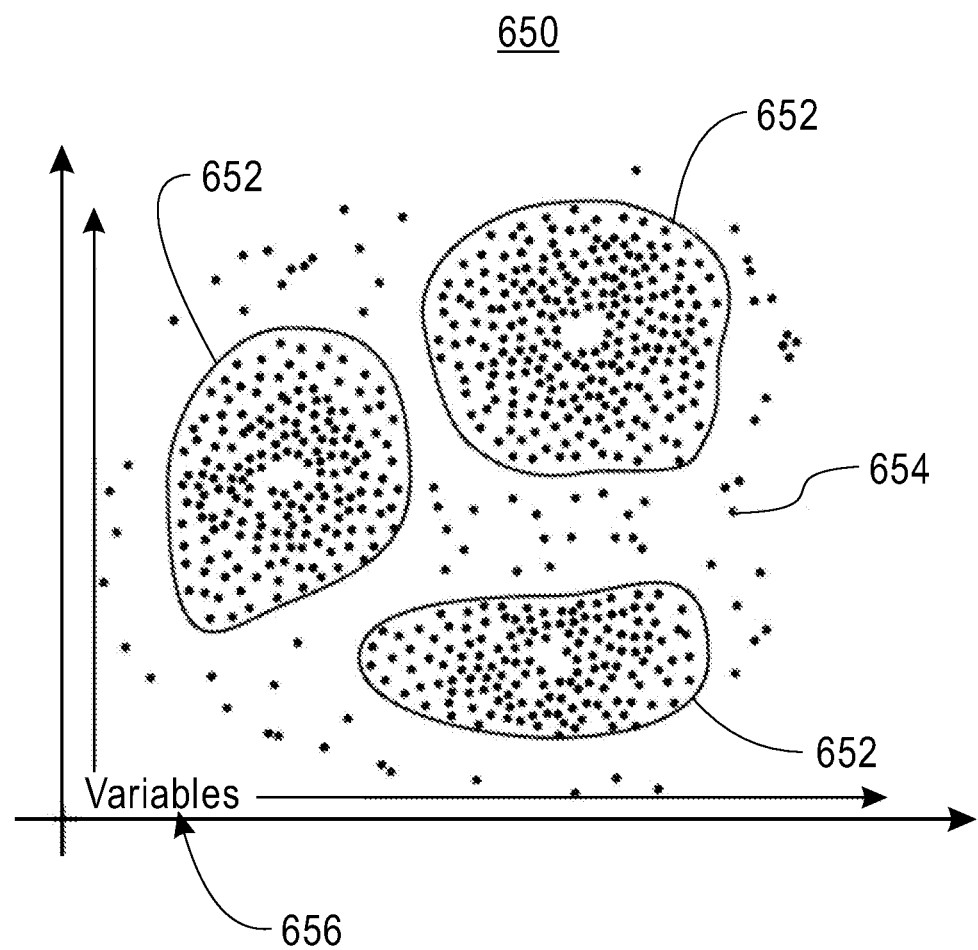
FIG. 6 is a plot diagram of a first embodiment of a system according to the present invention.

In some embodiments of the present invention, and in reference to FIG. 6 plot diagram 650, the multi-dimensional analysis output can be visualized as identifying task clusters, where the proximate words discovered aggregate to "customer" or synonyms thereof. This is shown in FIG. 4, plot diagram 650. In addition, for each cluster, a relationship map can be built from the low-level API data.

Some embodiments of the present invention may include one, or more, of the following operations, features, characteristics and/or advantages: (i) devices will be communicating with a centralized module to identify if similar categories of devices are available; (ii) will be identifying which device is comparatively superior or power efficient; and (iii)

power can be transferred from a lesser efficient device to a comparatively better device so that better power utilization can be accomplished (for example: devices D5 and D7 are in the same category, but D7 is more power efficient, so power will be transferred from device D5 to D7, and device D7 will perform the activity).

Some embodiments of the present invention may include one, or more, of the following operations, features, characteristics and/or advantages: (i) during power transfer, the devices will be communicating with each other to identify remaining work to be performed to complete an activity; and (ii) the appropriate amount of power will be transferred to complete the particular steps (for example: device D5 has almost completed the activity. Only a limited amount of power is required, so device D5 will receive power from any device, such as device D1, D2, D3, or D4 etc., to complete the remaining work).

Some embodiments of the present invention may include one, or more, of the following operations, features, characteristics and/or advantages: (i) devices will be communicating with each other to identify the capabilities of each device; (ii) if one or more device can perform multiple steps with power efficiency, then the power can be transferred to the multi-tasking activity devices; and (iii) the intelligent system will also be considering success and failure of the steps in the workflow, and accordingly, the power transfer rule will be updated.

Some embodiments of the present invention may include one, or more, of the following operations, features, characteristics and/or advantages: (i) in a multi-device ecosystem where multiple activities are being performed, the intelligent system will be communicating with each other device; and (ii) available power in each device can identify the logical clusters of devices so that device to device power can be minimized, (for example, a cluster of devices will be identified in such a way that minimum power transfer is required. This will be identified based on available power in each device).

In some embodiments of the present invention, the relative position of the devices in a workflow, and accordingly, the power transfer rule will dynamically be executed to ensure the activities are completed.

Some embodiments of the present invention may include one, or more, of the following operations, features, characteristics and/or advantages: (i) if any activity needs to be performed, then based on historical data, the intelligent system will be identifying the sequence of tasks that are to be performed to complete the activities where the steps of the activities will be arranged in a workflow; (ii) the devices will be recognized based on steps of the activity to be performed where, based on the position of different steps of the activity in the workflow and mapping of device functionality, the intelligent system will be identifying: (a) the position of the devices in the workflow, and (b) will know the device action sequence; (iii) when any activity is to be performed, the system will be identifying the devices to perform each and every step of the activity where, based on historical data, will identify: (a) what amount of power is required in each step, and (b) what is the aggregated power required; (iv) the devices will be collaborating with each other to: (a) identify available power in each device, and (b) identify if there is a shortage of power in one or more devices; (v) devices will be logically clustered to perform the power activity and, based on the position of the devices in the activity workflow, the power transfer rule will dynamically be created so that power is not transferred in the wrong direction; and (vi) devices will be communicating with each other to identify: (a) which device has comparatively better capacity or is more power efficient in the same category, and (b) a power transfer rule will be created so that activity can be completed successfully with the available power.

Some embodiments of the present invention recognize a system for device to device power transfer based on an identified common goal to perform an activity and appropriate positions of the devices involved in the workflow to achieve that common goal, comprising of: (i) an analysis of several relevant data sources, including low-level device interfaces, application interfaces and other events occurring in proximity of the devices; (ii) a clustering mechanism to group related devices that are involved in a common task based on proximity events; (iii) a relationship discovery mechanism to understand device dependencies within each cluster determined by a previous step; (iv) a mechanism for device to device communication, during task execution, to determine relative power expectations, capacity, and efficiency across all participating devices; (v) a mechanism for device to device communication during task execution to determine power transfer direction requirements; (vi) a mechanism to determine the best choice of devices for power transfer based on line of sight and the least obstructed path; and (vii) a mechanism for device to device power transfer rule creation based on the governing mechanisms described above.

Some embodiments of the present invention may include one, or more, of the following operations, features, characteristics and/or advantages: (i) includes data gathered from relevant device interfaces and sources to determine clusters of related devices, followed by relationship discovery within those clusters to focus device-to-device communication mechanisms; (ii) utilizes a module to analyze data gathered from low-level device and application interface, as well as events occurring in proximity of the devices, to perform clustering and form task and proximity-based device clusters; (iii) utilizes a module to perform relationship discovery within each cluster to understand dependencies between various tasks and devices; (iii) utilizes device-to-device communication modules during task execution to determine the best choice of devices, taking into consideration: (a) relative power and capacity requirements, (b) line of sight/obstruction, and (c) task directionality requirements; (iv) includes a holistic power transfer rule creation based on: (a) analysis of data gathered from low-level device and application interfaces as well as events occurring in proximity of the devices, (b) a common task and proximity-based clustering mechanism to group related devices, (c) a relationships discovery mechanism to understand dependencies within each cluster, and (d) a device-to-device communication mechanisms to determine: (1) relative power, (2) capacity, (3) line-of-sight/obstruction, and (4) directionality expectations.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Electrically Connected/Electrical Connectivity: means either directly electrically connected, or indirectly electrically connected, such that intervening elements are present; an electrical connection may include, but need not be limited to, elements such as capacitors, inductors, transformers, vacuum tubes, and the like. Further, the connectivity may be such that power can be transferred from connected devices.

What is claimed is:

1. A computer-implemented method comprising:
    identifying a set of devices performing a common activity;
    establish an electrical connectivity plan for power transfer among a set of participating devices included in the set of devices;
    dividing the common activity into a set of steps, each step performed by a single device on behalf of the set of participating devices to complete the common activity;
    assigning each step of the set of steps to one of the participating devices;
    monitoring charge level of the set of participating devices during performance of the set of steps; and
    responsive to a charge level of a first device of the set of participating devices being below a threshold level, causing a power transfer to the first device from a second device of the set of participating devices according to the electrical connectivity plan.

2. The computer-implemented method of claim 1 further comprising:
    monitoring use of a first set of devices including the set of devices for performance of a common activity.

3. The computer-implemented method of claim 1 wherein each device of the set of participating devices performs a portion of the common activity before the common activity is divided into a set of steps.

4. The computer-implemented method of claim 3 wherein the set of steps is only steps of the common activity not yet performed by any device of the set of participating devices.

5. The computer-implemented method of claim 1 further comprising:
    determining a power transfer capability of each identified device.

6. The computer-implemented method of claim 5 wherein:
    establishing the electrical connectivity plan is based on the power transfer capability of each identified device; and
    the set of participating devices have power transfer capabilities that permit power transfer to at least one other participating device.

7. A computer program product comprising:
    a set of storage device(s); and
    computer code stored collectively in the set of storage device(s), with the computer code including data and instructions to cause a processor(s) set to perform at least the following operations:
        identifying a set of devices performing a common activity,
        establish an electrical connectivity plan for power transfer among a set of participating devices included in the set of devices,
        dividing the common activity into a set of steps, each step performed by a single device on behalf of the set of participating devices to complete the common activity,
        assigning each step of the set of steps to one of the participating devices,
        monitoring charge level of the set of participating devices during performance of the set of steps, and
        responsive to a charge level of a first device of the set of participating devices being below a threshold level, causing a power transfer to the first device from a second device of the set of participating devices according to the electrical connectivity plan.

8. The computer program product of claim 7 wherein the computer code further includes instructions for causing the processor(s) set to perform the following operation(s):
    monitoring use of a first set of devices including the set of devices for performance of a common activity.

9. The computer program product of claim 7 wherein each device of the set of participating devices performs a portion of the common activity before the common activity is divided into a set of steps.

10. The computer program product of claim 9 wherein the set of steps is only steps of the common activity not yet performed by any device of the set of participating devices.

11. The computer program product of claim 7 wherein the computer code further includes instructions for causing the processor(s) set to perform the following operation(s):
    determining a power transfer capability of each identified device.

12. The computer program product of claim 11 wherein:
    establishing the electrical connectivity plan is based on the power transfer capability of each identified device; and
    the set of participating devices have power transfer capabilities that permit power transfer to at least one other participating device.

13. A computer system comprising:
    a processor(s) set;
    a set of storage device(s); and
    computer code stored collectively in the set of storage device(s), with the computer code including data and instructions to cause the processor(s) set to perform at least the following operations:
        identifying a set of devices performing a common activity, establish an electrical connectivity plan for power transfer among a set of participating devices included in the set of devices, dividing the common activity into a set of steps, each step performed by a single device on behalf of the set of participating devices to complete the common activity, assigning each step of the set of steps to one of the participating devices, monitoring charge level of the set of participating devices during performance of the set of steps, and responsive to a charge level of a first device of the set of participating devices being below a threshold level, causing a power transfer to the first device from a second device of the set of participating devices according to the electrical connectivity plan.

14. The computer system of claim 13 wherein the computer code further includes instructions for causing the processor(s) set to perform the following operation(s):

monitoring use of a first set of devices including the set of devices for performance of a common activity.

15. The computer system of claim 13 wherein each device of the set of participating devices performs a portion of the common activity before the common activity is divided into a set of steps.

16. The computer system of claim 15 wherein the set of steps is only steps of the common activity not yet performed by any device of the set of participating devices.

17. The computer system of claim 13 wherein the computer code further includes instructions for causing the processor(s) set to perform the following operation(s):

determining a power transfer capability of each identified device.

18. The computer system of claim 17 wherein:

establishing the electrical connectivity plan is based on the power transfer capability of each identified device; and the set of participating devices have power transfer capabilities that permit power transfer to at least one other participating device.

\* \* \* \* \*